(12) United States Patent
Kuo et al.

(10) Patent No.: US 7,247,054 B2
(45) Date of Patent: Jul. 24, 2007

(54) ELECTRICAL CARD CONNECTOR

(75) Inventors: Ming-Lun Kuo, Tu-cheng (TW);
Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/323,802

(22) Filed: Dec. 30, 2005

(65) Prior Publication Data
US 2006/0205278 A1    Sep. 14, 2006

(30) Foreign Application Priority Data
Mar. 11, 2005    (TW)    .............................. 94203785 U

(51) Int. Cl.
*H01R 24/00* (2006.01)

(52) U.S. Cl. ...................... 439/630; 439/607

(58) Field of Classification Search .............. 439/630, 439/159, 157
See application file for complete search history.

(56) References Cited

U.S. PATENT DOCUMENTS

| 6,475,005 | B2 |  | 11/2002 | Yu | |
| 6,568,960 | B2 | * | 5/2003 | Bricaud et al. | ............. 439/630 |
| 6,641,413 | B2 | * | 11/2003 | Kuroda | ....................... 439/159 |
| 6,716,066 | B1 | * | 4/2004 | Kuo | ............................ 439/630 |
| 6,780,062 | B2 | * | 8/2004 | Liu et al. | .................... 439/630 |
| 6,786,415 | B2 | * | 9/2004 | Yiu | ............................ 235/486 |
| 6,857,907 | B1 | * | 2/2005 | Hung et al. | ................. 439/630 |
| 6,863,571 | B2 | * | 3/2005 | Sato et al. | .................. 439/630 |
| 6,872,095 | B2 | * | 3/2005 | Sato et al. | .................. 439/630 |
| 6,932,652 | B1 | * | 8/2005 | Chen | ......................... 439/630 |
| 6,960,104 | B1 | * | 11/2005 | Lwee | ......................... 439/630 |
| 6,971,918 | B1 | * | 12/2005 | Su et al. | ..................... 439/630 |
| 6,974,349 | B2 | * | 12/2005 | Tsai | ............................ 439/630 |
| 2002/0102882 | A1 |  | 8/2002 | Tanaka | |
| 2003/0064627 | A1 | * | 4/2003 | Ooya et al. | ................. 439/630 |
| 2005/0176304 | A1 | * | 8/2005 | Yiu | ............................ 439/630 |
| 2005/0277333 | A1 | * | 12/2005 | Kuo | ............................ 439/607 |

* cited by examiner

*Primary Examiner*—Tulsidas C. Patel
*Assistant Examiner*—Harshad C Patel
(74) *Attorney, Agent, or Firm*—Wei Te Chung

(57) ABSTRACT

An electrical card connector for receiving two electronic cards (7, 8) different in sizes and shapes comprises an insulating header (1), a plurality of electrical contacts (5) retained in the insulating header (1) and each having an engaging portion (51) for electrically connecting with an inserted card (7, 8), and a metallic shell (3) covering on the insulating header (1). The metallic shell (3) further has a top wall (31) providing at three elastic pieces (311, 312, 313). Wherein the width between a first and second elastic pieces (311, 312) accords with the width of a first card (7), and the width between the first and a third elastic pieces (311, 313) accords with the width of a second card (8).

19 Claims, 6 Drawing Sheets

ELECTRICAL CARD CONNECTOR

BACKGROUND OF THE INVENTION

1. Field of the Invention

The present invention generally relates to an electrical card connector, and in particular to an electrical card connector having an improved shell.

2. Description of Related Art

As the popularity of notebook computers increases, integrated circuit (IC) cards are becoming more common for increasing storage capacity or for interfacing the notebook computers with other devices. Electrical card connectors are commonly used to connect motherboards of the computers with the cards. Usually, the electrical card connector includes a shell which can electrically connect with an outer face of the IC card and perform electrostatic discharge (ESD) function.

As disclosed in U.S. Pat. No. 6,475,005, an electrical card connector comprises an insulative housing and a shell covering on the insulative housing, the shell and the insulative housing combine to define a receiving room for receiving a card. The shell has a pair of sidewalls and the front end of each sidewall, which is close to an opening of the receiving room, provides a stamped spring arm bending inwardly. When inserting the card into the electrical card connector, the spring arm can electrically connect with the outer face of the card so as to perform ESD function by a grounding plate of the electrical card connector connected with a printed circuit board (PCB). Another example disclosed in U.S. App. No. 2002/0102882 provides a card connector device which comprises a box shaped frame and a metal cover mounted on the frame. The cover has an upper plate providing three elastic pieces, which not only perform ESD function but also increase the contact between the card connector and an inserted card by the elastic pieces pressing downwardly against the card.

However, if a card connector allows two or more cards different in shapes and sizes to be simultaneously inserted therein, some cards may become positional excursion for being asymmetrically pressed by elastic pieces which perform ESD function provided on a shell of the card connector. As a result, the electrical connection between the card and the card connector may be not good and further the quality of the signal transmission may be not good.

SUMMARY OF THE INVENTION

Accordingly, what is needed is an electrical card connector having an improved shell which not only performs ESD function but also prevents inserting cards from becoming positional excursion.

In order to achieve the needs set forth, one embodiment of an electrical card connector for receiving two electronic cards different in sizes and shapes in accordance with the present invention comprises an insulating header, a plurality of electrical contacts retained in the insulating header and each having an engaging portion for electrically connecting with an inserted card, and a metallic shell covering on the insulating header, the metallic shell and the insulating header combining to define a receiving room with an opening, through which the card is inserted into the receiving room, the metallic shell further having a top wall providing at least three elastic pieces. The width between a first and second elastic pieces accords with the width of a first card, and the width between the first and a third elastic pieces accords with the width of a second card.

Other advantages and novel features of the present invention will become more apparent from the following detailed description of the present embodiment when taken in conjunction with the accompanying drawings.

DETAILED DESCRIPTION OF THE INVENTION

Figure 1:
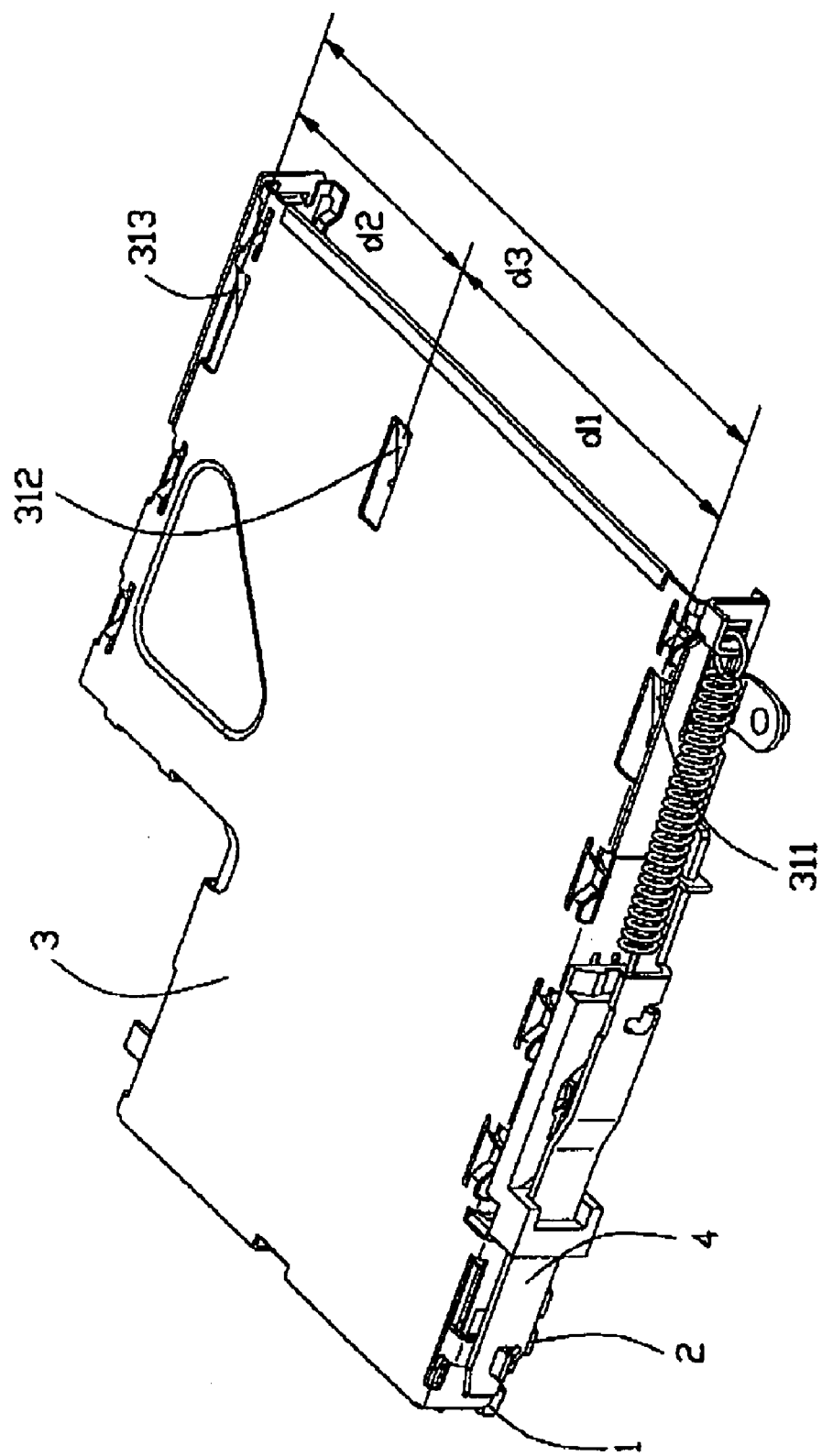
FIG. 1 is an assembled perspective view of an electrical card connector according to one embodiment of the present invention.

Referring to FIGS. 1–6, an electrical card connector in accordance with one embodiment of the present invention comprises an insulating header 1, a plurality of electrical contacts 5 retained in the insulating header 1, a metallic shell 3 covering on the insulating header 1, a receiving room 6 defined by the metallic shell 3 combining with the insulating header 1 for respectively receiving two different electronic cards 7, 8, and a card release mechanism 4 attached to one side of the metallic shell 3 for ejecting the card 7, 8 therefrom.

The insulating header 1 has a pair of guiding arms 12, a transverse base 11 connecting the pair of the guiding arms 12, a tongue 111 protruding from a middle of the transverse base 11 to the receiving room 6, and a slant prominency 13 protruding from an end of one guiding arm 12 to the receiving room 6. The tongue 111 has a plurality of electrical contacts 5 retained therein and each electrical contact 5 has a securing portion 53 secured in the transverse base 11, an engaging portion 51 extending ahead from an end of the securing portion 53 and retained in a passageway 1111 defined in the tongue 111 for electrically engaging with the card 7, 8, a connecting portion extending downwardly from the other end of the securing portion 53, and a soldering portion 52 extending flatly and backwardly from an end of the connecting portion for being soldered on a printed circuit board (PCB). Moreover, each guiding arm 12 defines a guiding groove 121 in the inner side thereof and the guiding grooves 121 are adapted for guiding the card 7, 8 being further inserted to electrically engage with the engaging portions 51 of the electrical contacts 5. The slant prominency 13 and the metallic shell 3 combine to define a slant groove, which makes the receiving room 6 as L-shaped for receiving the first card 7 of L-shaped and guides the first card 7 being inserted to the receiving room 6. In other words, a gap of the first card 7 matches the slant prominency 13 and a shorter side of the first card 7 electrically engages with the engaging portions 51 of the electrical contacts 5.

Figure 2:
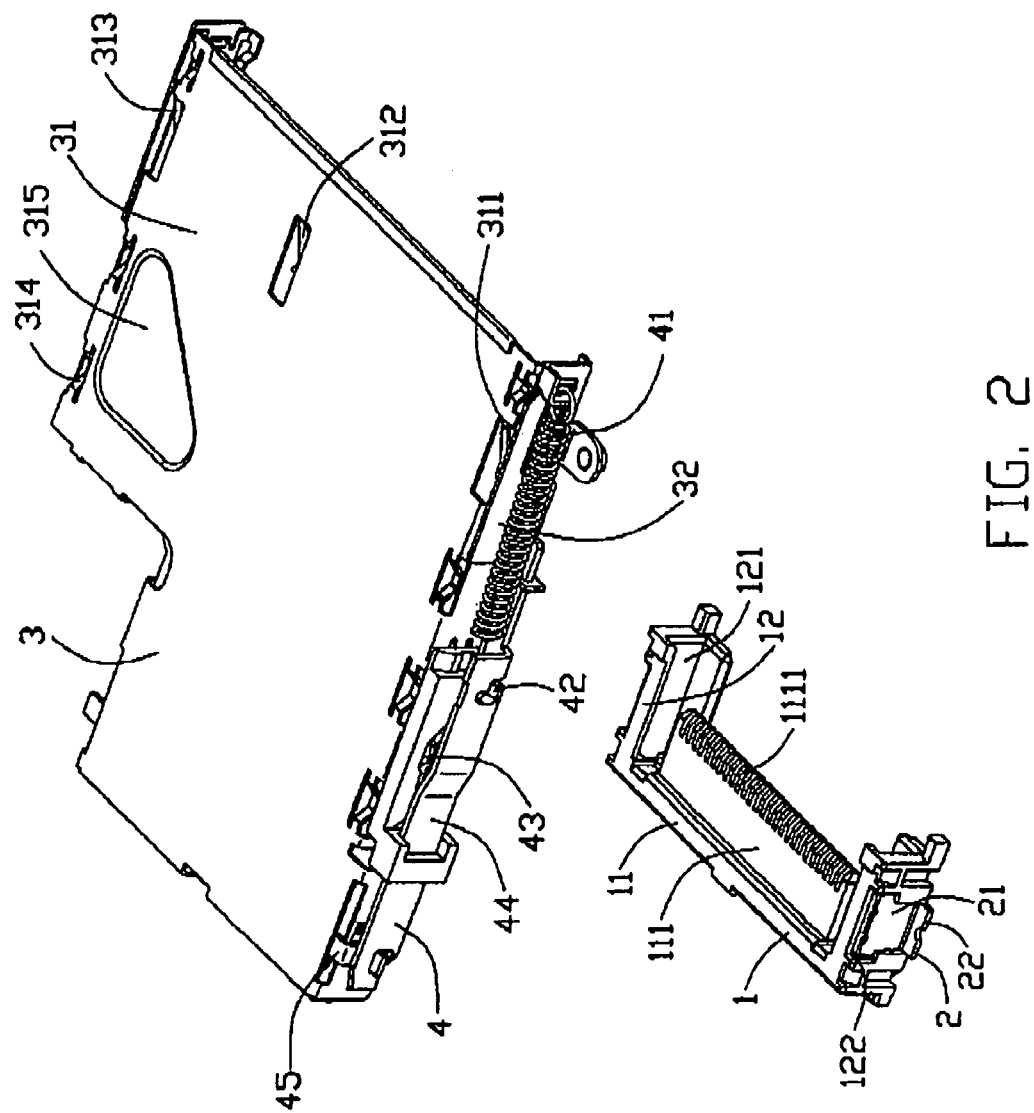
FIG. 2 is an exploded perspective view of the electrical card connector.

Referring to FIG. 2, the electrical card connector further has a pair of metal pieces 2 respectively retained in a receiving recess 122 defined in the outer side of the guiding arm 12. The metal piece 2 has an engaging section 21 received in the receiving recess 122, and a soldering section 22 extending outwardly and perpendicularly to the engaging section 21 and the guiding arm 12 for being soldered on the PCB.

The metallic shell 3 covers on the insulating header 1 and make contacts with the metal pieces 2. The metallic shell 3 has a top wall 31 of L-shaped, a pair of sidewalls 32 extending downwardly from the top wall 31, and a pair of bending walls 33 extending flatly and inwardly from a part of sidewalls 32 which do not cover on the guiding arms 12. Each bending wall 33 defines a plurality of first holes 330 at intervals and a first stamped elastic piece 331 connects with two opposite peripheral edges of the first hole 330 and extends therebetween. Also, the middle of the first stamped elastic piece 331 is bending upwardly to define a first bending portion 3311. Simultaneously, two opposite sides of the top wall 31 above the bending walls 33 also define a plurality of second holes 330' at intervals and a second stamped elastic piece 331' connects with two opposite peripheral edges of the second hole 330' and extends therebetween. Also, the middle of the second stamped elastic piece 331' is bending downwardly to define a second bending portion 3311'. For the distance between the first and second stamped elastic pieces 311, 311' provided on the top wall 31 and the bending walls 33 is shorter than that between the top wall 31 and the bending walls 33, the card 7, 8 is secured in the receiving room 6. On the other hand, three portions of the top wall 31 near an opening 61 of the receiving room 6, which is for the card 7, 8 being inserted into, are cut out, leaving respective projection pieces uncut, to form a first, second, and third apertures. The three projection pieces are bent downwardly to form a first, second, and third elastic pieces 311, 312, and 313. The first elastic piece 311 is arranged close to one sidewall 32 of the metallic shell 3, a second elastic piece 312 is arranged close to the other sidewall 32 of the metallic shell 3, and a third elastic piece 313 is arranged between the first and second elastic piece 311, 312, all of which are disposed in a row. The distance between the first and third elastic pieces 311, 313 is d1, which is equal to the width between the pair of guiding arms 12, the distance between the second and third elastic pieces 312, 313 is d2, and the distance d3 between the first and second elastic pieces 311, 312 is d3, wherein d3=d1+d2, and d1>d2.

Figure 3:
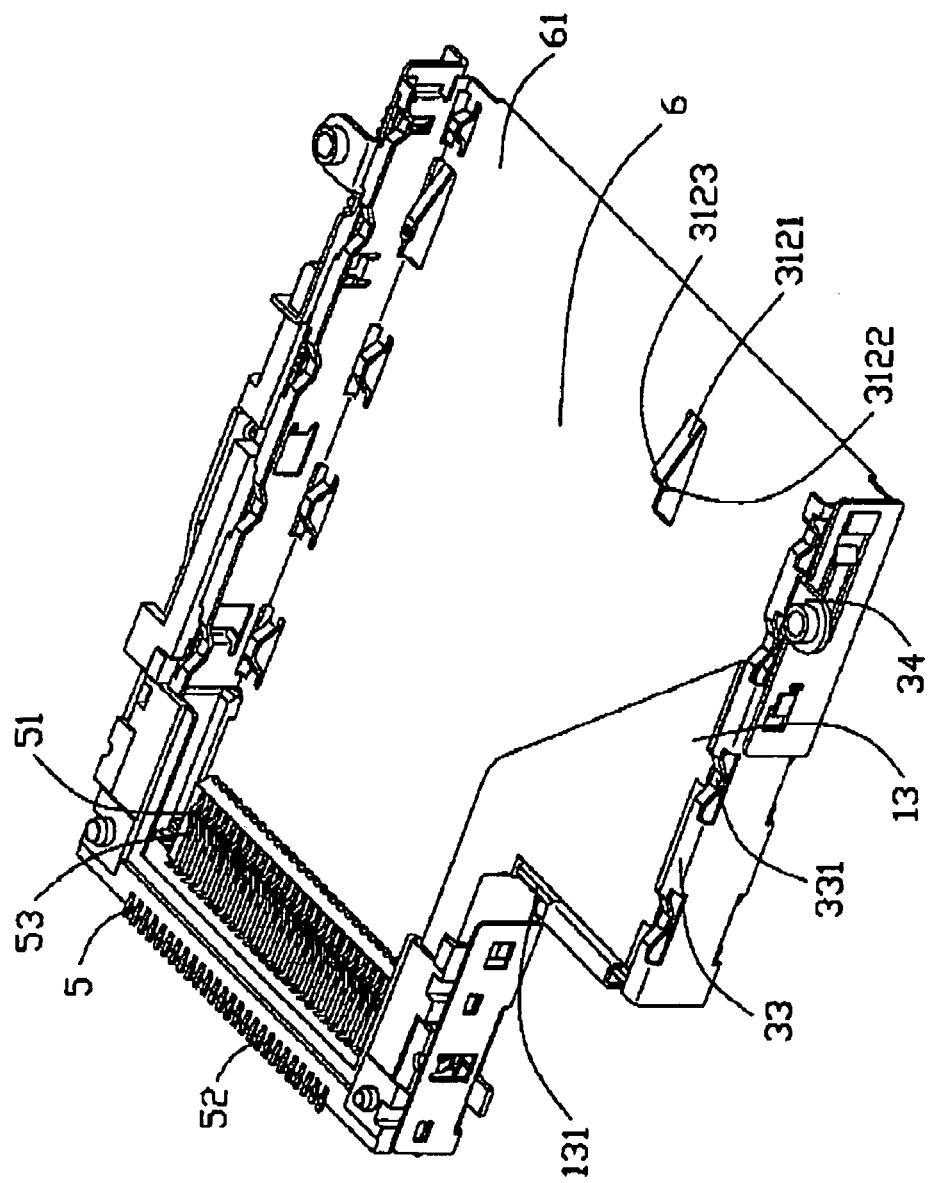
FIG. 3 is an assembled perspective view, seen from a bottom side, of the electrical card connector.

As shown in FIGS. 1–3, the card release mechanism 4 comprises a base 40 secured on one sidewall 32 of the metallic shell 3, a guider pin 41 with one end connecting to the base 40, a push bar 42 connected to the other end of the guider pin 41, a spring 43 with one end connected to a center of the guider pin 41 and the other end connected to a tab 35 of a stand-off device 34 secured on a front end of the sidewall 32, which is near the opening 61 of the receiving room 6, and an ejecting plate 44 with one end connecting to the push bar 42. The base 40 has a body portion, a heart groove 401 defined in the body portion, a post 402 protruding from the body portion. The push bar 42 has a body portion assembled through the post 402 of the base 40, an indentation 421 disposed at a rear end of the body portion, and an aperture 422 defined in the body portion. The guider pin 41 has the end connecting to the heart groove 401, and the opposite end extending through the aperture 422 of the push bar 42. The ejecting plate 44 is disposed in the receiving room 6 and above the tongue 111, and has a locking portion 441 bending upwardly from an end thereof and secured in the indentation 421 of the push bar 42. When the card 7, 8 is inserted through the opening 61 into the receiving room 6 and pushes the ejecting plate 44, which is originally slant in the receiving room 6, the ejecting plate 44 is sliding ahead along a slot (not shown) defined in the metallic shell 3, simultaneously, the guider pin 41 is moving along the heart groove 401 till stopping at a position, as a result, the card 7, 8 electrically engages with the electrical contacts 5. When releasing the card 7, 8 from the receiving room 6, the card 7, 8 is further pushed so that the guider pin 41 slides over the position, then the ejecting plate 44 is sliding backwardly along the slot at the force of the spring 43 acting on the push bar 42, as a result, the inserted card 7, 8 is released.

Figure 4:
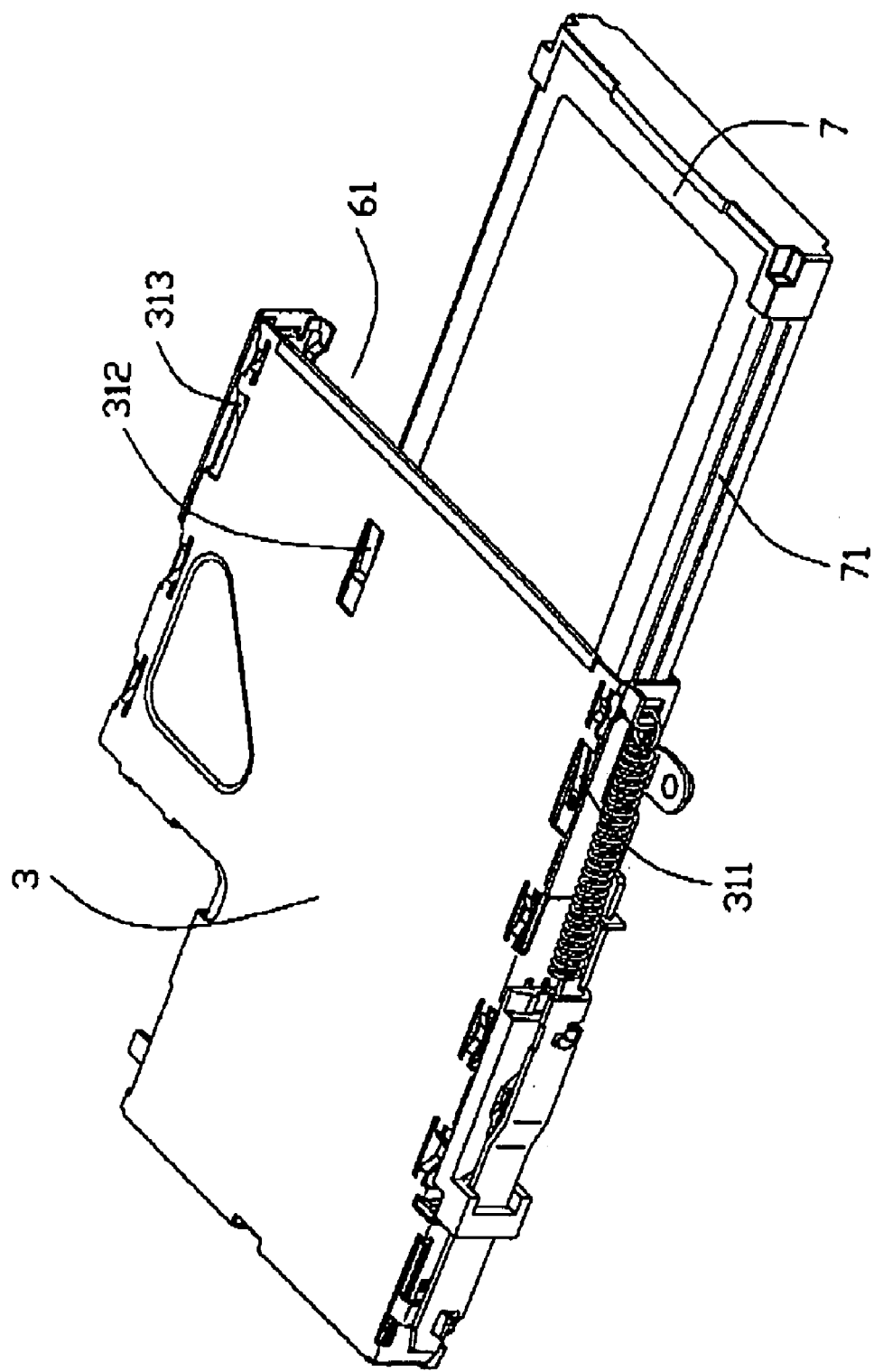
FIG. 4 is an assembled perspective view showing the electrical card connector having a first card retained therein.
Figure 5:
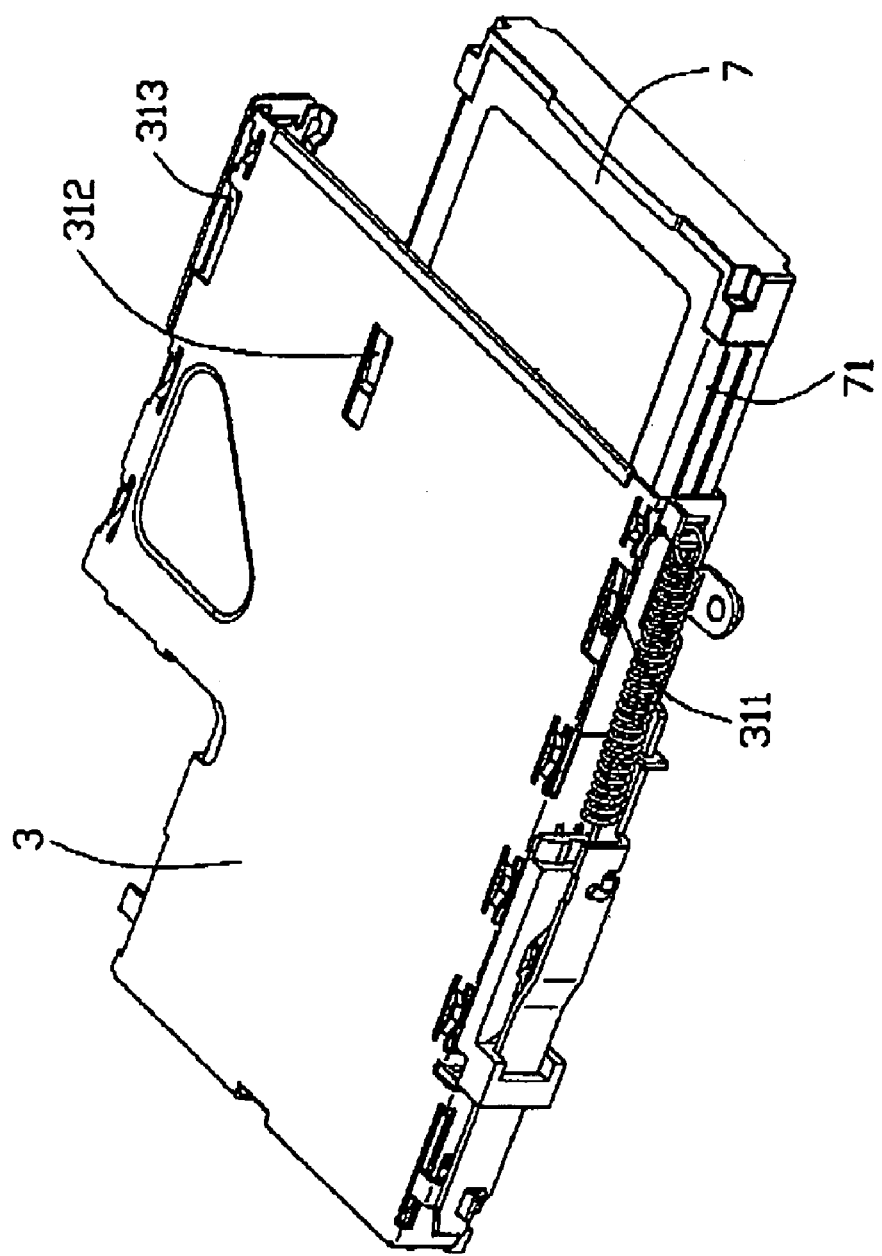
FIG. 5 is an assembled perspective view showing a second card being inserted into the electrical card connector.
Figure 6:
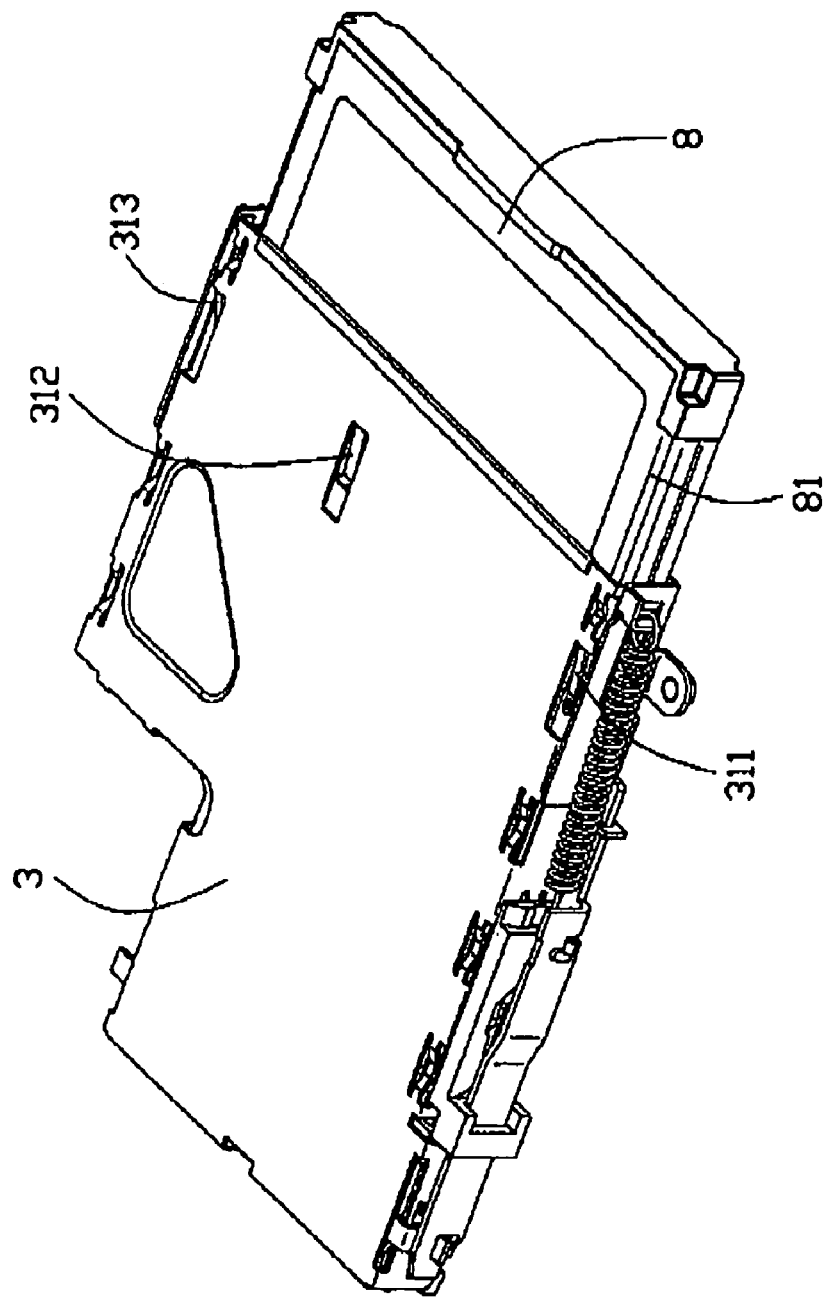
FIG. 6 is a perspective assembled view showing the electrical card connector having the second card retained therein.

Further referring to FIGS. 1, 3, and 4, the first card 7 has a pair of steps 71 disposed at two opposite longitudinal sidewalls thereof and the width of the first card 7 is equal to d3. When the first card 7 is inserted through the opening 61 and into the receiving room 6, the first elastic piece 311 of the metallic shell 3 contacts and presses one step 71 of the first card 7, at the same time, the second elastic piece 312 of the metallic shell 3 contacts and presses the other step 71 of the first card 7. At this way, the first and second elastic pieces 311, 312 not only perform ESD function but also prevent the first card 7 from becoming positional excursion for the pressure on the first card 7 by the first and second elastic pieces 311, 312 is the same. Then, the first card 7 is further inserted into the receiving room 6, the stamped elastic pieces 331 of the metallic shell 3 contact and press the first card 7, so the first card 7 is secured in the receiving room 6, and firmly and electrically connects with the engaging portions 51 of the electrical contacts 5

Finally, referring to FIGS. 1, 3, 5, and 6, the second card 8 also has a pair of steps 81 disposed at two opposite longitudinal sidewalls thereof and the width of the second card 8 is equal to d1. When the second card 8 is inserted through the opening 61 and into the receiving room 6, the first elastic piece 311 of the metallic shell 3 contacts and presses one step 81 of the second card 8, at the same time, the third elastic piece 313 of the metallic shell 3 contacts and presses the other step 81 of the second card 8. At this way, the first and third elastic pieces 311, 313 not only perform ESD function but also prevent the second card 8 from becoming positional excursion for the pressure on the second card 8 by the first and third elastic pieces 311, 313 is the same. Then, the second card 8 is further inserted into the receiving room 6, the stamped elastic pieces 331 of the metallic shell 3 contact and press the second card 8, so the second card 8 is secured in the receiving room 6, and firmly and electrically connects with the engaging portions 51 of the electrical contacts 5

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector for receiving a wider L-shaped card and a narrow quadrangular card selectively, comprising:

an insulating header;

a plurality of electrical contacts retained in the insulating header, and each having an engaging portion for electrically connecting with an inserted card; and a metallic shell covering on the insulating header, the metallic shell and the insulating header combining to define a receiving room with an opening, through which the card is inserted into the receiving room, the shell being formed in an L shape corresponding the L-shaped and comprising a narrow front portion corresponding to the quadrangular card, the metallic shell further having a top wall providing at least three elastic pieces; wherein the width between a first and second elastic pieces accords with the width of L-shaped card, and the width between the first and a third elastic pieces accords with the width of the quadrangular card.

2. The electrical card connector as described in claim 1, wherein the first, second and third elastic pieces are arranged in a row and each formed on the shell integrally.

3. The electrical card connector as described in claim 2, wherein the first, second and third elastic pieces are arranged near the opening of the receiving room.

4. The electrical card connector as described in claim 1, wherein the cards each has a step formed on two sides respectively, the first and second elastic pieces are extended to contact and press two opposite steps of the L-shaped card, the first and the third elastic pieces are extended to contact and press two opposite steps of the quadrangular card.

5. The electrical card connector as described in claim 1, wherein the insulating header has a pair of guiding anus, and a tongue disposed between the pair of guiding arms and protruding to the receiving room, the width between the first and third elastic pieces accords with the width between the pair of guiding arms.

6. The electrical card connector as described in claim 5, wherein the insulating header further has a slant prominency protruding from an end of one guiding arm to the receiving room, the slant prominency and the metallic shell combine to define a slant groove making the receiving room as L-shaped.

7. The electrical card connector as described in claim 1, wherein the metallic shell has a pair of sidewalls extending downwardly from the top wall, and a pair of bending walls extending flatly and inwardly from the sidewalls, each bending wall defines a plurality of first holes at intervals and a first stamped elastic piece connects with two opposite peripheral edges of the first bole and extends therebetween, simultaneously, two opposite sides of the top wall above the bending walls also define a plurality of second holes at intervals and a second stamped elastic piece connects with two opposite peripheral edges of the second hole and extends therebetween, so the card is secured between the first and second elastic pieces.

8. The electrical card connector as described in claim 5, wherein the middle of a first stamped elastic piece is bending upwardly to define a first bending portion, and the middle of the second elastic piece is bending downwardly to define a second bending portion.

9. The electrical card connector as described in claim 1, further comprising a card release mechanism assembled to one side of the metallic shell.

10. The electrical card connector as described in claim 1, wherein the receiving room formed between the first and third elastic pieces is adapted for retaining the quadrangular Card and the receiving room formed between the first and second elastic pieces is formed to receive the L-shaped card.

11. An electrical card connector for receiving first and second electronic cards sized different from each other in a transverse direction, comprising:

an insulating header, a plurality of electrical contacts retained in the insulating header, and each having an engaging portion for electrically connecting with one of said first and second cards; and a metallic shell covering on the insulating header, the metallic shell and the insulating header combining to define a receiving room with an opening, through which one of the first and second cards is inserted into the receiving room, the metallic shell farther having a top wall providing at least first, second and third elastic pieces which are deflectable in a vertical direction perpendicular to a card insertion direction and the transverse direction; wherein a width between the first and the second elastic pieces is equal to a transverse dimension of the first card, and a width between the first and the third elastic pieces is essentially equal to a transverse dimension of the second card.

12. The card connector as claimed in claim 11, wherein said second elastic piece is located between the first and the third elastic pieces along the transverse direction.

13. The card connector as claimed in claim 12, wherein the first, second and third elastic pieces are aligned with one another along the transverse direction.

14. The card connector as claimed in claim 11, wherein said first, second and third elastic pieces are located in positions, along the card insertion direction, where the card moves and passes.

15. An electrical card connector assembly comprising:

first and second cards;

an insulating header, a plurality of electrical contacts retained in the insulating header, and each having an engaging portion; and a metallic shell covering on the insulating header, the metallic shell and the insulating header combining to define a receiving room with an opening, through which one of said first and second cards are mutually exclusively inserted into the receiving room, the metallic shell further having a top wall providing at least first, second and third elastic pieces which are deflectable in a vertical direction perpendicular to a card insertion direction and the transverse direction; wherein a width between the first and the second elastic pieces is essentially equal to a transverse dimension of the first card, and a width between the first and the third elastic pieces is essentially equal to a transverse dimension of the second card.

16. The connector assembly as claimed in claim 15, wherein the first and second elastic pieces are upwardly deflected by the first card when the first card is inserted into the receiving room, and the first and third elastic pieces are upwardly deflected by the second card when the second card is inserted into the receiving room.

17. The card connector assembly as claimed in claim 15, wherein a position of at least one of said first, second and third elastic pieces are located in front of a front edge of one of said first and second cards which confronts the header, when said one card is fully received in the receiving room.

18. The card connector assembly as claimed in claim 15, wherein both positions of the first and second elastic pieces are located in front of a front edge of the first card which confronts the header, when said first card is fully received in the receiving room, and both positions of the first and third elastic pieces are located in front of a front edge of the second card which confronts the header, when said second card is fully received in the receiving room.

19. The card connector assembly as claimed in claim 15, wherein all said first, second and third elastic pieces are aligned with one another along the transverse direction.

* * * * *